Oct. 7, 1930.  W. H. SCHOONMAKER  1,777,479
CLUTCH FOR GEAR SETS
Original Filed March 1, 1923
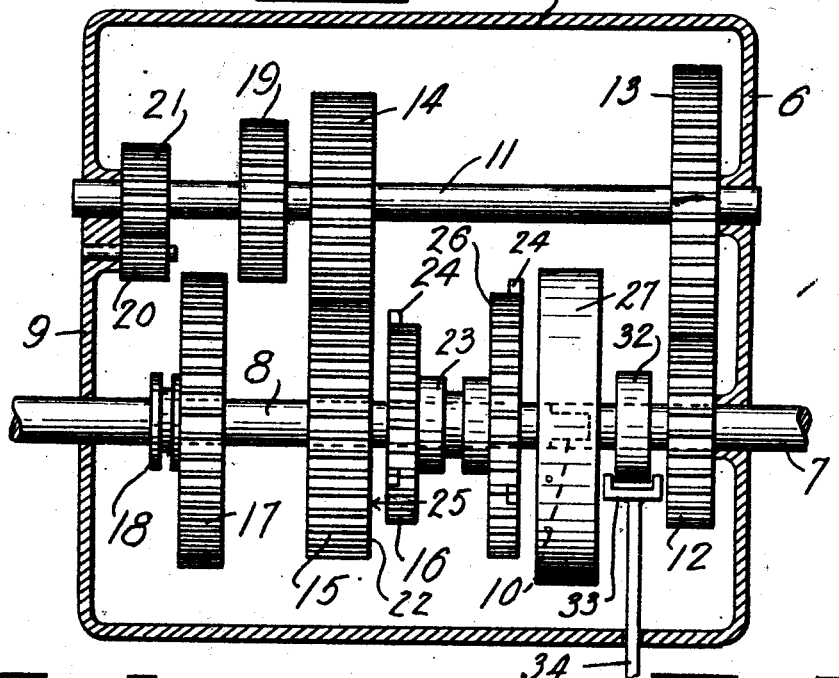
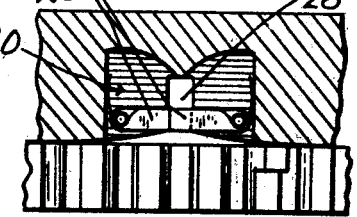
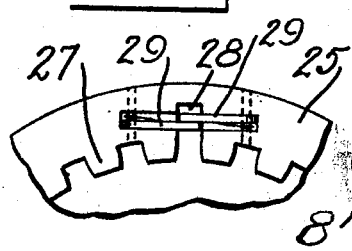
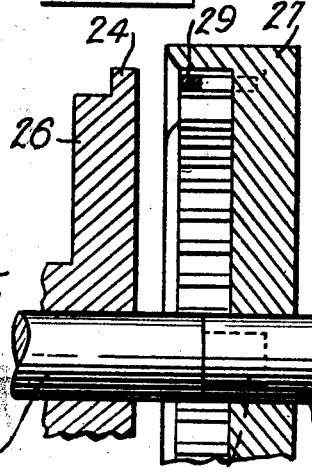

Patented Oct. 7, 1930

1,777,479

UNITED STATES PATENT OFFICE

WILLIAM H. SCHOONMAKER, OF MONTCLAIR, NEW JERSEY

CLUTCH FOR GEAR SETS

Application filed March 1, 1923, Serial No. 621,979. Renewed January 18, 1928.

This invention relates generally to power transmission devices of the sliding gear type and particularly relates to means for automatically bringing clutch members to be meshed to the same speed of rotation to thereby prevent clashing of the clutch teeth as the clutch members are brought into mutual engagement.

The invention includes the provision of means for producing frictional contact between clutch members which are desired to be intermeshed to thereby accelerate the speed of the member rotating at the lower speed and, at the same time, to produce a braking or retarding effect on the member rotating at the higher speed. The invention also includes means for directing the engaging teeth into intermeshing relation, the directing means being effective only when the speed of the two members is substantially the same.

In the drawings, in which a preferred embodiment of the invention has been selected for illustration, Figure 1 is a sectional view through a gear transmission case containing a transmission device embodying the invention.

Figure 2 is a sectional view on an enlarged scale showing a detail of clutch mechanism included in Figure 1.

Figure 3 is a horizontal section showing the clutch mechanism of Figure 2 in disengaged position.

Figure 4 is a view similar to Figure 3 showing the clutch mechanism in engaged position.

Figure 5 is a face view of a portion of the clutch mechanism.

Figure 6 is a view similar to Figure 5 of the other portion of the clutch mechanism.

Referring to the drawings for a more detailed description of the invention, a gear box 5 is shown in the end 6 of which is journaled power shaft 7 leading from the clutch and engine and driven shaft 8 journaled in the opposite end 9 of the gear box and having a rotatable engagement at 10 with the end of the power shaft 7. A counter or jack shaft 11 is journaled at its ends in the gear box 5 in parallel relation to the alined power and driven shafts already referred to.

A gear 12 keyed to the power shaft 7 is in constant mesh with a larger gear 13 keyed to the counter shaft 11 so that rotation of the power shaft 7 causes a corresponding rotation of counter shaft 11.

A gear 14 keyed to the counter shaft 11 is constantly in mesh with a gear 15 normally free to rotate idly on the driven shaft 8 but capable of being locked in driving engagement with the shaft 8 through the movement to the left of clutch element 16 as will be hereafter referred to. The ratio of gears 14 and 15 is such as to produce the second speed relation between power shaft 7 and driven shaft 8. Because of the constant intermeshing engagement of gears 14 and 15 they may be made of relatively soft metal to eliminate noise.

A gear 17 has a splined relation with the shaft 8 and can be moved longitudinally thereon through the engagement of a forked member (not shown) with a grooved collar 18. In the mid position shown in Figure 1 gear 17 is idle but it can be moved to the right to produce a low speed drive connection with gear 19 on counter shaft 11 or, when moved to the left, the reverse speed condition by engagement with intermediate spur gear 20 meshing with spur gear 21 keyed to the counter shaft.

As has already been indicated clutch element 16 can be moved along shaft 8 into engagement with gear 15 which has a set of internal gear teeth 22 for meshing engagement with the peripherally arranged teeth on clutch element 16. The clutch element 16 is carried by one end of a grooved collar 23 having a splined connection with the shaft 8, an operating member being provided for moving the collar through the operation of a gear-shift lever convenient to the operator.

An important feature of the invention resides in the provision of means for bringing about frictional contact of the clutch element 16 and the face of the element 15 as a preliminary to the positive locking of these members in operative relation. The frictional engagement of parts thus provided provides for the rapid bringing of the clutch element 16 to a velocity of rotation substantially the same as that of the gear 15 and without shock or jar.

The means for effecting this includes one or more radially projecting lugs 24 carried by the clutch element 16 for direct contact with the confronting face 25 of the gear 15, lugs 24 being provided also on a clutch element 26 carried by the other end of the grooved collar 23 for cooperation with a high-speed clutch member 27 keyed to the main power shaft 7 for rotation therewith.

In order to provide a locked or intermeshed relation of either clutch element 16 or 26 with the corresponding gear 15 or clutch member 27, the faces of the members 15 and 27 which are engaged by the lugs 24 are provided with lug receiving guiding notches or slots 28 which direct the clutch elements carrying the lugs into registering and intermeshing engagement with the internal teeth of the corresponding members in which the guide slots are formed.

In order to prevent engagement of the lugs 24 with the slots 28 when the difference in speed of rotation of the respective parts is so great as to cause a clash or shock if engagement took place, a pair of spring pressed arms 29 are mounted in a recess 30 in the gear in a position to normally close the entrance end of the directing slot 28 and cause the lugs to ride thereon across the position of the slot. This action is automatically produced by the difference in speed of rotation of the parts which restricts the time interval necessary for the lugs to overcome the resistance of the arms and enter the slots. It will be seen that spring members 31 act to hold the arms in their outward position across the entrance end of the slot.

The movement of a lug across the entrance end of a slot when a sufficient degree of difference of speed exists is facilitated by a special formation of the face of the gear in the immediate vicinity of the slot. The special formation consists of a shallow depression in this portion of the gear face which tends to lessen the force with which the lug bears against the gear in its movement across the region of the slot.

The provision of depressed areas in the face of the gears through which the lugs pass in the vicinity of the slot possesses a further useful function and that is the facility which it gives the operator for detecting through the contact of his hand with the change speed lever, the relative speed of the clutch members as well as the movement of the lugs into depressed areas and the consequent imminence of the registering position of the lugs and slots.

In addition to the means described for reconciling the speeds of the high speed and second speed gears with their respective clutch elements braking means are provided through a drum 32 on the power shaft 7 and a brake shoe 33 operating through a rod 34 having an operating connection with either the clutch pedal or gear shift lever so that in a neutral position of the parts, the rotation of the power shaft 7 and the shaft 11 with its gears is checked.

What I claim is:

1. In a clutch, two clutch members movable longitudinally for engagement, one of said members carrying a lug, the second member having a recess adapted to receive said lug, and a guard member mounted over said recess, said guard member being mounted on a pivot substantially parallel with the engaging faces of the clutch members.

2. In a clutch, two clutch members movable longitudinally for engagement, one of said members carrying a lug, the second member having a recess adapted to receive said lug, and a spring-pressed guard member mounted over said recess, said guard member being mounted on a pivot substantially parallel with the engaging faces of the clutch members.

3. In a clutch, two clutch members movable longitudinally for engagement, one of said members carrying a lug, the second member having a recess adapted to receive said lug, the surface of said second member sloping from opposite sides toward said recess, and a guard member mounted over said recess.

4. In a change-speed device, members mounted on a common axis for movement into and out of intermeshing engagement, confronting surfaces on said members adapted to be brought into frictional engagement with each other as a preliminary to the intermeshing operation, and one of said members being provided with an axially extending slot and the other with a lug for engagement with the slot for directing the members into intermeshing engagement when the frictional engagement of the gears has brought them to substantially the same speed of rotation.

5. In a change-speed device, a member having internal teeth and a member having teeth on its outer periphery, said members being mounted on a common axis for movement toward and from each other into and out of intermeshing engagement, radially extending lugs on one of said members adapted to frictionally engage the confronting face of the other member, and axially extending slots in the second-named member for receiving said lugs and directing the teeth into intermeshing relation when the difference in speed of rotation between the two members is low enough to permit the lugs to enter the slots.

6. In a change-speed device, a member having internal teeth and a member having teeth on its outer periphery, said members being mounted on a common axis for movement toward and from each other into and out of intermeshing engagement, radially extending lugs on one of said members adapted to frictionally engage the confronting face of the other member, the confronting face of the second-named member being provided with axially extending slots to receive said lugs and direct the teeth into intermeshing relation, and yielding means normally bridging the slots but permitting the lugs to enter the slots when the difference in rotative speed between the two members is sufficiently low.

7. In a change-speed device, a member having internal teeth and a member having teeth on its outer periphery, said members being mounted on a common axis for movement toward and from each other into and out of intermeshing engagement, radially extending lugs on one of said members adapted to frictionally engage the confronting face of the other member, the face of the second-named member being provided with axially extending slots to receive said lugs and direct the teeth into intermeshing relation, spring pressed arms mounted to normally bridge the entrance ends of the slots but arranged to yield inwardly under the pressure exerted by the lugs having a relatively slow movement, and said face being provided with shallow depressions in the regions provided with the slots.

8. Clutch mechanism comprising two clutch members movable longitudinally for engagement and having a plurality of interfitting jaws for normal driving engagement, one of the clutch members carrying a part extending radially beyond the normal periphery of said member, the other clutch member being formed with a depression for engaging said extending part.

In testimony whereof I affix my signature.

WILLIAM H. SCHOONMAKER.